Patented Feb. 26, 1929.

1,703,763

UNITED STATES PATENT OFFICE.

FERDINAND DIETZSCH, OF KINGSTON-ON-THAMES, ENGLAND.

TREATMENT OF ORES FOR EXTRACTING METALLIC VALUES THEREFROM.

No Drawing. Application filed October 31, 1927, Serial No. 230,171, and in Great Britain December 8, 1926.

The use of thiosulphate solutions as solvents for metallic values in ores has practically been limited to the treatment of gold and silver ores.

According to my invention a solution of a soluble thiosulphate is used in conjunction with sulphur dioxide for treating oxide, oxidized or roasted ores for the purpose of extracting from them copper or lead values. It is the function of the sulphur dioxide to convert the copper into a cuprous sulphite readily soluble in thiosulphate solution, and to convert the lead into sulphite and sulphate, also readily soluble in thiosulphate solution. By a modification, should the lead in the material under treatment be substantially wholly in the form of lead sulphate, treatment with sulphur dioxide is omitted.

The material may be treated first with a solution of sulphur dioxide and then with a solution of thiosulphate, preferably an alkali thiosulphate or an alkaline earth thiosulphate, or a mixture of these, or the material may be treated with a solution containing both thiosulphate and sulphur dioxide. The latter is the preferred mode when copper is in question, but in the case of lead-zinc ores it is advantageous to treat the material first with the sulphur dioxide solution in order to extract the bulk of the zinc, leaving the lead in the insoluble residue to be extracted afterwards by the thiosulphate solution. However, even when using the latter solution for extracting the lead it is well that it should contain sulphur dioxide because the preliminary treatment with that reagent may not have converted the whole of the lead into sulphite or sulphate.

The invention consists in bringing into contact with each other by percolation, agitation or otherwise the suitably crushed oxide, oxidized or roasted ore and an aqueous solution of the reagent. When the latter is thiosulphate in presence of sulphur dioxide, the thiosulphate solution may be made to dissolve sulphur dioxide before it is brought into contact with the ore, or the sulphur dioxide may be passed into a mixture of thiosulphate solution and ore.

Generally the dissolving effect on metallic values increases with the concentration of the solvent in respect of its content in both sulphur dioxide and thiosulphate; also, within certain limits, with the temperature of the solution. Working under pressure is not excluded.

The concentration of the thiosulphate solution is primarily a question of cost and that of the sulphur dioxide depends mainly on the amount of this gas which can be dissolved from a mixture of it with air of a given strength under conditions of temperature prevailing.

The dissolved metallic values may be precipitated by adding to the solution sulphuretted hydrogen, a sulphide, polysulphide, carbonate, hydroxide or oxide of an alkali or alkaline earth metal. The thiosulphate solution can generally be used again. When sulphuretted hydrogen is used the thiosulphate is more or less decomposed with precipitation of sulphur; it may be regenerated by heating it with lime in presence of sulphurous acid.

The following examples illustrate the invention:—

*Example 1.*—A west Australian oxidized copper ore, containing about 90 per cent of its copper in the form of carbonate and 10 per cent in the form of silicates, was crushed and screened through a $\frac{1}{4}''$ mesh and in order to facilitate rapid filtration all the fines were then removed from it by a second screening through a $\frac{1}{10}''$ mesh. 300 kilos of this product, assaying 6.27 per cent copper, were placed on a filter bed resting on a false bottom in a wooden leaching vat.

The leaching solution was prepared in the following manner:—An aqueous solution of calcium and sodium thiosulphate (which originally had been a sodium thiosulphate solution containing 15 per cent of $Na_2S_2O_3.5H_2O$ that had been used for leaching copper ore and from which the copper had been precipitated by lime, so that some calcium thiosulphate has been formed in the solution), was charged with sulphur dioxide to saturation by bubbling through it air containing 2.5 per cent of sulphur dioxide. Care was taken that the quantity of calcium thiosulphate in the leaching solution exceeded that required to combine with the total copper present to form the thiosulphate of copper. This precaution is necessary to avoid the presence of sodium sulphate when precipitating the copper later by lime, as this would cause the copper precipitate to be contaminated by calcium sulphate.

The solution, thus prepared, was allowed repeatedly to percolate slowly through the ore in the said leaching vat, the flow being regulated by means of a stop-cock. Prior to each passage of the solution through the ore, it was re-charged with sulphur dioxide by again bubbling through it air containing 2.5 per cent of sulphur dioxide.

The leached tailings were next washed by percolating water through them and in that manner the dissolved copper values and the sodium thiosulphate were recovered. The tailings assayed 0.226 per cent of copper, showing that 96.4 per cent of the copper content of the ore had been extracted.

Before precipitating the copper, the leaching solution was allowed to spend its excess sulphur dioxide content by percolating it through a fresh charge of ore without having previously re-charged it with sulphur dioxide. This procedure avoids the use of heat for expelling the sulphur dioxide and has an additional advantage, when calcium thiosulphate is present, because the latter decomposes at raised temperatures.

The dissolved copper in the solution was next precipitated as the hydroxide by the addition of lime.

Alternatively, the copper can be precipitated in the form of the sulphide by the addition of monosulphide of sodium, which in turn can be produced by reduction of the sodium sulphate by carbon. Sodium sulphate is a by-product of the process when sodium thiosulphate alone is used, that is, when no lime is used as precipitant.

An analysis of the solution from which the copper had been precipitated by sodium sulphide showed no chemical consumption of the thiosulphate, but a formation of sodium sulphate.

*Example 2.*—The material used was a roasted argentiferous lead-zinc ore, and assayed 15.5 per cent of lead, 27.5 per cent of zinc (2.2 per cent of which was water-soluble) and 802 grms. of silver per metric ton. The original sulphide ore had been roasted for the production of sulphuric acid, and had been severely over-roasted, that is without regulation of temperature and air-admission; as a consequence ferrites of zinc and other difficultly soluble zinc compounds had been formed.

This roasted product was crushed to pass through a 20 mesh sieve and 200 kilos of it were placed on a filter-bed as described in Example 1. A quantity of sulphurous acid, which had been prepared by bubbling air containing 5 per cent of sulphur dioxide through water, was allowed to percolate repeatedly through the lead-zinc product for 30 hours. The flow of the solution was regulated by means of a stop-cock. Before each passage of the leaching solution through the ore, air containing 5 per cent of sulphur dioxide was bubbled through it.

The residual ore which weighed 73.3 kilos was then washed by percolating water through it in order to recover the dissolved zinc values, and after drying, weighing and sampling, it was placed again in the leaching vat in readiness for leaching from it the lead and silver values.

The sample of the residual ore assayed 11.21 per cent of zinc and 41.31 per cent of lead, therefore, 84.98 per cent of the zinc values had been extracted and 1.8 per cent of the total lead content had gone into solution. No silver had been dissolved.

The zinc-bearing solution was reserved for purification and precipitation of the zinc.

The lead-bearing residual ore, containing the lead as a mixture of sulphite and sulphate was then treated with an aqueous solution of sodium and calcium thiosulphates, which had been charged with sulphur dioxide by bubbling through it air containing 5 per cent of sulphur dioxide. This solution had been originally one containing 15 per cent of $Na_2S_2O_3.5H_2O$, which had been used in dissolving a previous charge of lead-bearing residue and from which the lead was precipitated by lime, forming a quantity of calcium thiosulphate.

The leaching solution was percolated repeatedly through the lead-bearing residue and before each passage was re-charged with sulphur dioxide.

After this treatment the tailings, now weighing 31.2 kilos, contained practically no lead and assayed 576.9 grams of silver per metric ton, which corresponds with a 100 per cent extraction of the lead values and 88.78 per cent of the silver values.

The lead and silver-bearing thiosulphate leaching solution was allowed to percolate slowly through another portion of un-leached lead and silver-bearing residue, with the object of causing the solution to spend its excess of sulphur dioxide. This was done because sufficient heat to expel the excess of sulphur dioxide cannot be applied to a solution carrying lead thiosulphate without in part decomposing the compound.

For the purpose of recovering the zinc values from the solution containing sulphite and sulphate of zinc the solution was gently boiled so as to expel the excess sulphur dioxide. In doing this the bi-sulphites of zinc and iron were decomposed and monosulphite of zinc in the crystalline form, free from iron, was at first precipitated, but on prolonging the boiling, the hydroxide of iron was likewise precipitated. Having expelled the sulphur dioxide from the solution, the sulphite and the sulphate of zinc therein contained were converted into the thiosulphate of zinc in the following manner. A quantity of an aqueous solution containing the mixture of calcium and sodium thiosulphate, which had been used before to convert a charge of zinc sulphite-sulphate solution into one of thiosulphate of zinc, was added in sufficient quantity to redissolve the precipitated monosulphite of zinc and to convert both it and the sulphate into the thiosulphate of zinc. By this reaction the calcium radical of the thiosulphate was precipitated as a mixture of calcium sulphate and sulphite. Special care was exercised to avoid either calcium thiosulphate or sodium sulphate remaining in the solution, because the former would break up at higher temperatures and the latter would cause the precipitation of calcium sulphate together with the zinc hydroxide. The solution was boiled and compressed air was blown through it at the same time in order to oxidize most of the iron still remaining in the solution, which at raised temperature quickly hydrolyzes and precipitates as the hydroxide. The thiosulphate solution can be freed more completely from iron by adding finely crushed or precipitated calcium carbonate. As the water content of the thiosulphate solution was increased above the normal by joining it to the aqueous sulphite solution, it became imperative to reduce this increase of water by evaporation.

After the quantity of the solution had been brought to the normal and freed from iron, it was transferred to another vessel in which the zinc was precipitated as the hydroxide by the addition of lime. The precipitated hydroxide of zinc was found to be very pure, especially when carbonate of lime had been used while evaporating.

Calcium thiosulphate is regenerated while the zinc is being precipitated by lime.

The zinc sulphate and sulphite can be converted into thiosulphate of zinc by thiosulphate of calcium alone, that is, without an excess of sodium thiosulphate being present to dissolve the thiosulphate of zinc formed, because this latter compound is readily soluble in water alone. When calcium thiosulphate only is being used to convert the sulphate and sulphite of zinc into the thiosulphate of zinc, the whole of the calcium thiosulphate has to be used up, because the subsequent heating will break up any excess of that compound.

The lead from the lead-bearing thiosulphate solution which had been freed from the excess of sulphur dioxide by contact with fresh ore, is likewise precipitated as the hydroxide by the addition of lime. This procedure is necessary as the lead thiosulphate solution cannot be heated for the elimination of the sulphur dioxide without in part decomposing it.

The cheaper calcium thiosulphate may also be employed for leaching purposes without the addition of sodium thiosulphate, but in that case the precipitated lead hydroxide will be slightly contaminated by calcium sulphate.

The presence of sulphur dioxide in the leaching solution for lead compounds may be dispensed with when treating residual ore or other metallurgical products containing the lead as the sulphate. For instance ores that have been leached with sulphuric acid for the extraction of zinc values, but in most cases the presence of sulphur dioxide is actually needed, especially when it is desired to leach the ores rapidly.

After the precipitation of the lead, the silver values in the solution are precipitated in the usual manner by the addition of thiosulphate solution free from lead and containing sodium sulphide.

By the expressions "ores containing copper or lead in oxidized form" or "ores in oxidized form containing zinc, together with copper or lead," as used in appended claims, is meant any ore in which any or all of said metals is present in the form of oxide or its equivalent, such as carbonate, whether the metal is naturally present in the ore in such form or has been converted into such form by a preliminary treatment of the ore, for example by oxidizing roast.

Having thus described the nature of my said invention and the best means I know of carrying the same into practical effect, I claim:—

1. A process of treating ores containing copper or lead in oxidized form for the purpose of extracting metal values therefrom, which comprises acting on the material with sulphur dioxide in presence of water and subjecting the products of the reaction to the action of an aqueous solution of a thiosulphate.

2. A process of treating ores containing copper or lead in oxidized form for the purpose of extracting metal values therefrom, which comprises treating the material with a solution of a thiosulphate containing sulphur dioxide.

3. A process of treating ores containing copper or lead in oxidized form for the purpose of extracting metal values therefrom, which comprises treating the material first with a solution of sulphur dioxide and then with a solution of a thiosulphate.

4. A process of treating ores containing lead sulphate for the purpose of extracting lead values therefrom, which comprises treating the material with a solution of a thiosulphate.

5. A process of treating ores containing copper or lead in oxidized form for the purpose of extracting metal values therefrom, which comprises acting on the material with sulphur-dioxide in presence of water, subjecting the products of the reaction to an aqueous solution of a thiosulphate, adding to the thiosulphate solution which has been used for the extraction an alkaline earth metal which forms a soluble thiosulphate to precipitate the metal value, and using the solution of the alkaline earth thiosulphate thus produced for treatment of a further batch of material.

6. A process of treating ores containing copper or lead in oxidized form for the purpose of extracting metal values therefrom, which comprises treating the material with a solution of a thiosulphate containing sulphur dioxide, adding to the thiosulphate solution which has been used for the extraction an alkaline earth metal which forms a soluble thiosulphate so as to precipitate the metal value, and using the solution of the alkaline earth thiosulphate thus produced for treatment of a further batch of material.

7. A process of treating ores containing copper or lead in oxidized form for the purpose of extracting metal values therefrom, which comprises treating the material first with a solution of sulphur dioxide and then with a solution of a thiosulphate, adding to the thiosulphate solution which has been used for the extraction an alkaline earth metal which forms a soluble thiosulphate so as to precipitate the metal value therefrom, and using the solution of the alkaline earth metal thiosulphate thus produced for treatment of a further batch of material.

8. A process of treating ores containing lead sulphate for the purpose of extracting lead values therefrom, which comprises treating the material with a solution of a thiosulphate, adding to the thiosulphate solution which has been used for the extraction an alkaline earth metal which forms therewith a soluble thiosulphate so as to precipitate the lead therefrom, and using the solution of the alkaline earth metal thiosulphate thus produced for treatment of a further batch of material.

9. A process of treating ores in oxidized form containing zinc together with copper or lead for the purpose of extracting metal values therefrom, which comprises treating the material with a solution of sulphur-dioxide, separating the solution containing extracted zinc values from the material, treating the material with a solution of a thiosulphate, treating the solution containing extracted zinc values with an alkaline earth metal thiosulphate so as to obtain a solution of zinc thiosulphate, and precipitating zinc from the last-named solution by means of an alkaline earth metal which forms a soluble thiosulphate.

In testimony whereof I have signed my name to this specification.

FERDINAND DIETZSCH.